(No Model.)  3 Sheets—Sheet 1.
J. LOBET.
APPARATUS FOR CUTTING GLASSWARE.
No. 530,189. Patented Dec. 4, 1894.
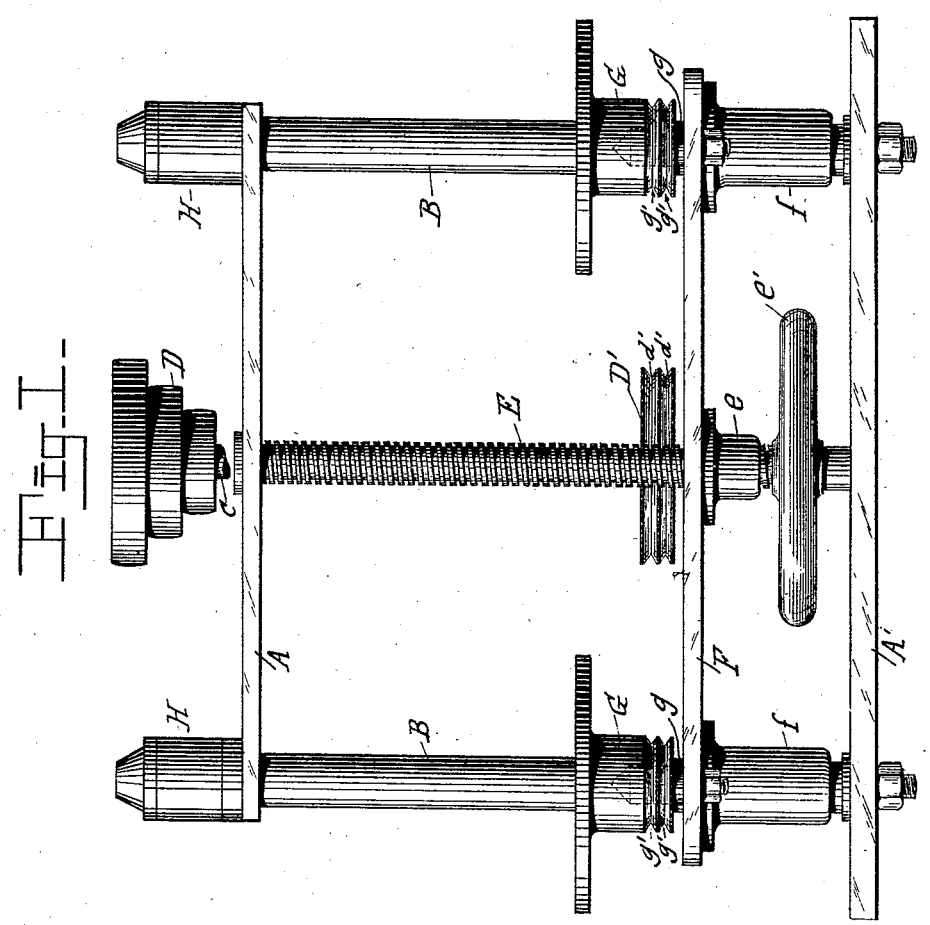
Witnesses:
W. E. Bowen
M. C. Pinckney
Inventor:
Jean Lobet
By J. E. M. Bowen
Atty.

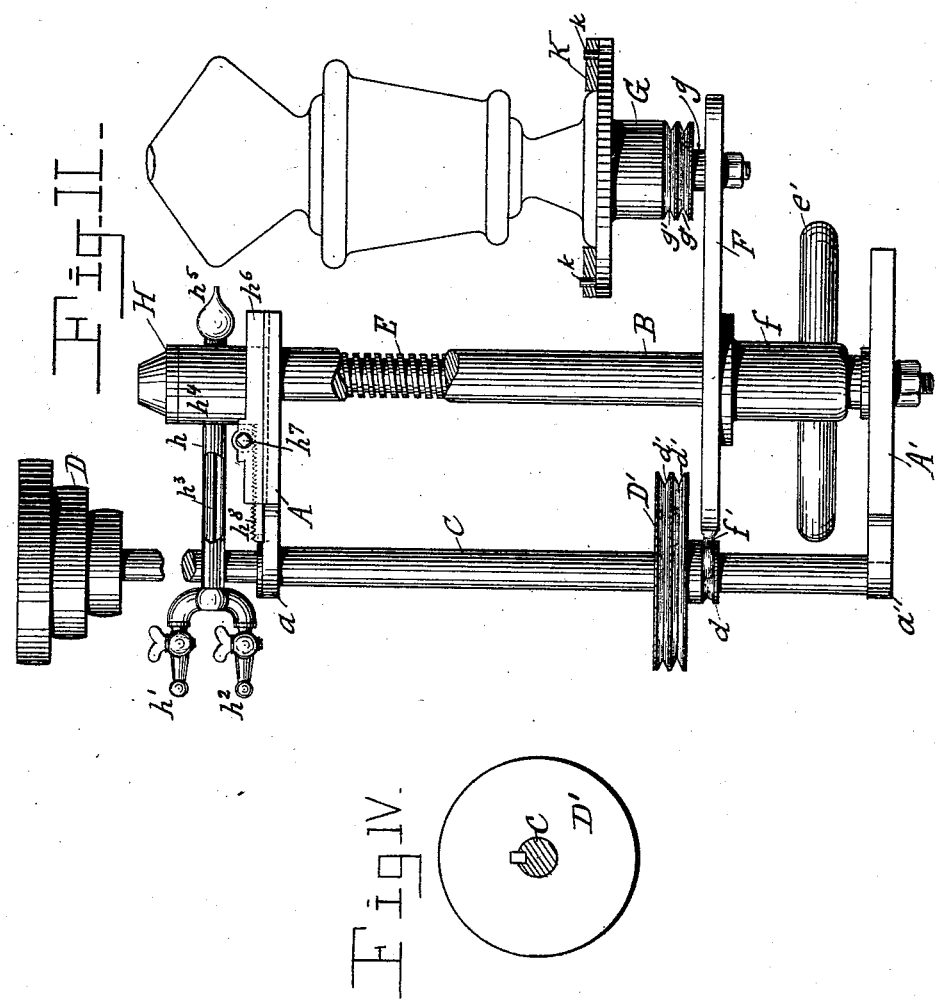

(No Model.)  J. LOBET.  3 Sheets—Sheet 3.
APPARATUS FOR CUTTING GLASSWARE.
No. 530,189.  Patented Dec. 4, 1894.
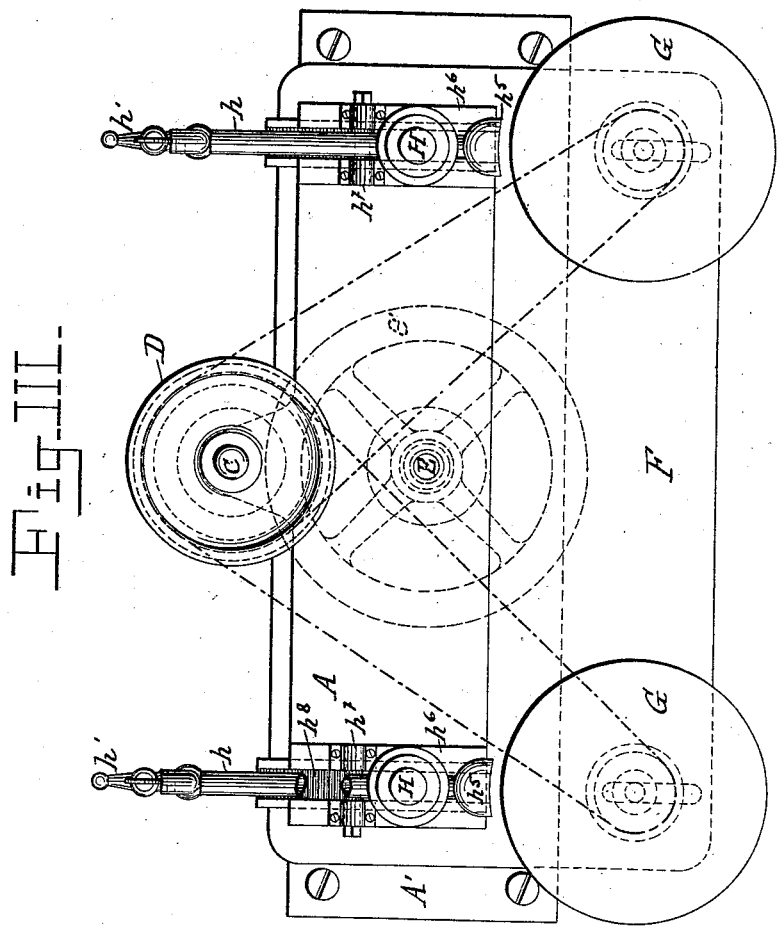
Witnesses:—
W. E. Bowen
W. C. Pinckney
Inventor:—
Jean Lobet,
By J E W Bowen
Atty.

United States Patent Office.

JEAN LOBET, OF FLÉMALLE-GRANDE, NEAR LIEGE, BELGIUM.

APPARATUS FOR CUTTING GLASSWARE.

SPECIFICATION forming part of Letters Patent No. 530,189, dated December 4, 1894.

Application filed March 12, 1894. Serial No. 503,307. (No model.)

*To all whom it may concern:*

Be it known that I, JEAN LOBET, a subject of the King of the Belgians, residing at Flémalle-Grande, near Liege, Kingdom of Belgium, have invented certain new and useful Improvements in Apparatus for Cutting Glassware, of which the following is a specification.

My invention refers to improvements in apparatus for cutting glass-ware.

The purposes of my invention are to so construct such apparatus that it may be adapted to cut the various kinds of glass-ware quickly and in a neat and proper manner.

For the purpose of making my invention clear to those engaged in the art I give below a description of the apparatus employed by me with reference to the accompanying drawings, wherein—

Figure 1 represents a front view of the machine; Fig. 2, a side view and Fig. 3 a top view of the apparatus. Fig. 4 shows a cross-section of the screw-threaded main spindle with the pulley in engagement therewith.

Corresponding letters throughout the different views refer to like parts.

The frame of the machine comprises two platforms A and A', made of cast iron or other suitable material, rigidly joined together by columns or posts B. The platforms A and A' are provided in the rear with projections or lugs $a$ and $a'$ intended to receive the shaft C to the upper part of which is wedged the fast running pulley or cone D which transmits motion to the machine from any suitable source of power.

Between the platforms A and A' there is provided a third platform F which is movable. The same is perforated so as to permit the upright posts B and the screw spindle E to pass through the same.

For the purpose of guiding the movable platform F properly, sleeves or muffs $f$ are attached to its under side where the upright posts pass through the same.

In the center of the machine there is arranged a screw spindle E the ends of which rest in sockets provided in platforms A and A'. Underneath the part of the platform F through which passes said screw spindle there is connected with it a sleeve or muff $e$ screw threaded internally. The screw spindle E is operated by hand by means of the wheel $e'$ attached to its lower part in such a manner as to be capable of being turned in either direction, whereby the platform F may be moved by means of the sleeve $e$ which is arranged in close proximity.

To the right and to the left of the platform F there are fixed pivots $g$ having conical upper extremities. These pivots support circular platforms or revolving disks G. These disks include sleeves recessed so as to engage with and to so accommodate themselves to the shape of the pivots $g$ that it is possible to revolve said disks upon such pivots without causing more than slight friction, and also include the upper parts forming platforms upon which the articles which are to be cut are placed.

In order to impart to the disks G revolving motion their under sides are provided with double grooved wheels $g'$ to which the requisite motion is imparted from pulley D' by means of cords or belts, such pulley D' being also provided with a double groove $d'$. Pulley D' is mounted upon the spindle C but in order to enable it to follow the platform F in its vertical movements, it is provided with a projection which glides within a groove countersunk in the spindle $c$. The connection between pulley D' and platform F is made with the aid of a sleeve $d$ attached to the pulley and of a projection $f'$ provided on platform F and engaging with a part of such sleeve $d$ as shown in Fig. 2.

Blow pipes H are placed to the right and left of the platform A. Said blow pipes are fed through tubes $h$ carrying rubber lined stop-cocks $h'$ and $h^2$. The tubes $h$ are divided interiorly into two sections by means of a thin longitudinal partition $h^3$, owing to which one of said sections may be employed for the passage of gas and the other for the passage of air, so that the two fluids do not meet until they reach the chamber $h^4$, supplying the blow-pipes, to be discharged from there through the jets $h^5$.

For the purpose of permitting the blow-pipes to be adjusted in accordance with the diameters of the articles which are to be cut, the same are mounted upon guides $h^6$. Said guides carry toothed pinions $h^7$ which engage with ratchets $h^8$ secured to the platform A. The pinions $h^7$ are actuated by means of a suitable key.

It will readily be seen that by means of the guides $h^6$ and the pinions and ratchets described, the extent of the movement of the blow pipes toward and away from the articles to be cut can be regulated much closer than can be done by hand, and in addition the flame can thus at all times be directed exactly at right angles to the periphery of the circular article to be cut thus securing the most intense and direct application of the flame at the exact point selected.

In order to properly center the articles which are to be cut, such as wine glasses, goblets, vases, &c., rings K made of any suitable material are attached to revolving disk G with the aid of small tenons or pins K inserted into proper recesses provided for such purpose upon the platforms of such revolving disks. These rings which serve to hold the articles which are to be cut in proper positions, must be readjusted in their positions in accordance with the diameters of the articles which are to be cut.

The propulsion of the machine is accomplished as follows: The pulley D receives its revolving motion through suitable driving belt from some proper motor and transmits it through spindle $c$ to pulley D which in turn revolves the disks G. See Fig. 3.

I proceed as follows, when the machine is to be made use of: Just at the point where the article is to be cut, I make a slight mark by means of an independent cutter mounted in a cleat and capable of horizontal and vertical adjustment in accordance with the diameter and the height of the articles which are to be cut. I thereupon place the article which is to be cut upon one of the disks G and by means of wheel $e'$ I carefully adjust its elevation so as to bring the mark made on the face of the article to be cut as mentioned above opposite to the jet of the blow-pipe H. In order to work to best advantage I mark the article by means of the cutter, place it upon one of the disks, mark a second article and place it upon the other disk and while the first one becomes heated while being revolved and is being cut owing to the action of the heat I remove it with one hand and with the other hand I put in its place the third piece which I mark and otherwise treat in the same manner.

My apparatus which permits of treating on it from four thousand five hundred to five thousand pieces per day has also the advantage that it will produce a neat and clean cut which does away entirely with the labor of turning the article for the purpose of finishing the parts where the cutting has been done.

I claim as new and desire to secure by Letters Patent—

1. In a machine for cutting glass-ware, an intermediate movable platform guided in its vertical movement by sleeves attached to its under surface which sleeves are made to slide along the posts supporting the upper and lower platform, and a revolving disk mounted on said intermediate platform, and a blow pipe adjusted in proper relation thereto, substantially as set forth.

2. In a machine for cutting glass-ware, the driving spindle receiving motion from any suitable source of power with the aid of a fast running pulley or cone attached to its upper part, an adjustable platform, and a revolving disk mounted thereon, the driving spindle having underneath a pulley with double groove for transmitting power to the revolving disk, which pulley may assume a higher or lower position owing to a projection adjusted to slide within a groove provided on the spindle, substantially as set forth.

3. In a machine for cutting glass-ware, the combination of the double groove pulley sliding on the driving spindle, a grooved sleeve connected with the movable platform, revolving supports for the glass-ware on such platform, and means for raising and lowering the platform and for permitting the pulley to follow the platform in its upward and downward movements, substantially as set forth.

4. In a machine for cutting glass-ware, the arrangement of the revolving disks supported by pivots attached to the movable platform, the revolving disks comprising sleeves the inner surfaces of which conform with the pivots so as to permit of their revolving thereon with slight friction, their upper part forming platforms for receiving the articles which are to be cut, the lower parts of the sleeves being provided with double grooves for transmitting to them revolving motion from the grooved pulley on the driving spindle, substantially as set forth.

5. In a machine for cutting glass ware, the combination with a revolving support for the article to be cut, of a blow pipe, guides along which it may be moved toward such revolving support and a ratchet and pinion for adjusting its position, substantially as set forth.

Signed at Brussels, in the Kingdom of Belgium, this 26th day of January, 1894.

JEAN LOBET.

Witnesses:
EDOUARD LABARQUE,
EDGARD DE EYMONTOWICZ.